US006925581B2

(12) United States Patent
Hommel

(10) Patent No.: US 6,925,581 B2
(45) Date of Patent: Aug. 2, 2005

(54) METHOD AND DEVICE FOR MONITORING AND DISCONNECTING CONTROL UNITS IN A NETWORK AND A NETWORK

(75) Inventor: Mathias Hommel, Wolfsburg (DE)

(73) Assignee: Robert Bosch GmbH, Stuttgart (DE)

( * ) Notice: Subject to any disclaimer, the term of this patent is extended or adjusted under 35 U.S.C. 154(b) by 472 days.

(21) Appl. No.: 10/026,026

(22) Filed: Dec. 20, 2001

(65) Prior Publication Data

US 2002/0174388 A1 Nov. 21, 2002

(30) Foreign Application Priority Data

Dec. 20, 2000 (DE) .......................................... 100 63 934

(51) Int. Cl.[7] .............................................. G06F 11/00
(52) U.S. Cl. .......................................... 714/14; 714/22
(58) Field of Search ............................. 714/14, 22, 24, 714/49

(56) References Cited

U.S. PATENT DOCUMENTS

| | | | | |
|---|---|---|---|---|
| 4,245,344 A | * | 1/1981 | Richter ......................... | 714/43 |
| 5,499,366 A | | 3/1996 | Rosenberg et al. | |
| 5,530,877 A | * | 6/1996 | Hanaoka ...................... | 713/300 |
| 5,581,692 A | * | 12/1996 | Nevitt et al. ................... | 714/12 |
| 6,199,422 B1 | * | 3/2001 | Boerhout et al. ............. | 73/1.82 |
| 6,202,171 B1 | * | 3/2001 | Townsley et al. ............. | 714/14 |
| 6,345,369 B1 | * | 2/2002 | Kitamorn et al. ............. | 714/14 |
| 6,549,977 B1 | * | 4/2003 | Horst et al. .................. | 711/113 |

FOREIGN PATENT DOCUMENTS

WO     WO 90/09631     8/1990

OTHER PUBLICATIONS

Kabore, P. "A mixed–integer formulation for fault detection and diagnosis: modelling and an illustraive example" date unknown.*
Johnson, Allen "Survey of Software Tools for Evaluating Reliabilty, Availability and Serviability" ACM Dec. 1988.*

* cited by examiner

Primary Examiner—Bryce P. Bonzo
(74) Attorney, Agent, or Firm—Kenyon & Kenyon

(57) ABSTRACT

A method for monitoring control units in a network is described, each control unit including a security function for detecting errors, a monitoring routine being assigned to each error and a plurality of monitoring routines being available, a shutdown matrix which is subdivided according to errors being assigned to the security function, at least one of the monitoring routines being selected from the plurality of monitoring routines according to the errors present in the shutdown matrix, depending on at least one first condition, the shutdown matrix containing various shutdown strategies, and on detection of at least one error by the monitoring routine, one of the shutdown strategies is carried out in the network, depending on at least the first condition and/or at least one second condition, at least one control unit in the network being shut down.

10 Claims, 3 Drawing Sheets

Fig 3

| Error number (10) | Operating state (11) | Error description (error label) (12) | Where should the monitoring be performed? (13) | | | Detection times (ms, s, ...) (14) | Limits (units depending on application) (15) | Operating mode (17) | | | Shutdown strategy (19) |
|---|---|---|---|---|---|---|---|---|---|---|---|
| | | | SG1 | SG2 | ... SGn | | | Function 1 | Function 2 | ... Function n | |
| 1 | Initialization | Battery voltage <V | 0 | 1 | 0 | T1 | G1 | | | | A1 A3 A5 ... |
| 2 | ... | Temperature >°C | 1 | 1 | 0 | ... | ... | | | | A2 A4 ... |
| ... | Normal mode | ... | ... | ... | ... | ... Tn | ... Gn | | | | A5 A6 ... |

METHOD AND DEVICE FOR MONITORING AND DISCONNECTING CONTROL UNITS IN A NETWORK AND A NETWORK

FIELD OF THE INVENTION

The present invention relates to a method and a device for monitoring control units in a network and a corresponding network, each control unit containing a safety function for detecting errors.

BACKGROUND INFORMATION

The monitoring of control units in a network is described in PCT Published Patent Application No. 90/09631 (corresponding to U.S. Pat. No. 5,499,366). This publication describes a method of monitoring a computer network having at least two subscribers connected by a databus having at least two lines, each having a receiving component and/or a transmitting component. This method is characterized in that the function of the databus and/or the subscribers is monitored with the help of error detection signals of at least one subscriber, and emergency operation measures tailored to the given error case are taken to establish defined emergency operation modes. After the first emergency operation measure has been taken, a check is performed to determine whether the computer network is functioning free of errors. If this is the case, the first emergency operation measure is maintained and also the emergency operating mode achieved with it is maintained. If, after the first emergency operation measure has been taken, additional errors occur in the computer network, the first emergency operation measure is cancelled and the second emergency operation measure is taken. If no additional errors then occur, the emergency operating mode established through this measure, special emergency operation, is maintained. Only if additional errors continue to occur are the respective subscribers or the entire computer network shut down. The cited patent does not describe the use of a shutdown matrix or a differentiated shutdown having different shutdown strategies.

Therefore, in the case of monitoring a plurality of control units in one network, i.e., in a distributed system, the situation described above is to be improved by implementing a more differentiated shutdown of individual control units or the system as a whole by using a shutdown matrix.

SUMMARY OF THE INVENTION

The present invention therefore describes a method and a device for monitoring control units in a network and a corresponding network, each control unit including a security function for detecting errors and a monitoring routine being assigned to each error, a plurality of monitoring routines being available.

A shutdown matrix which is subdivided according to errors is advantageously assigned to the security function, at least one of the monitoring routines being selected from the plurality of monitoring routines according to errors present in the shutdown matrix, depending on at least one first condition, the shutdown matrix containing various shutdown strategies, on detection of at least one error by the monitoring routine, one of the shutdown strategies of the network being carried out, depending on at least the first condition and/or at least one second condition, at least one control unit in the network being shut down.

It is also advantageous that the present invention makes available a method to permit a shutdown which is differentiated in particular according to the cause of the error, the operating mode and the operating state in distributed systems, in particular SCS systems (safety-critical systems).

Thus, the method according to the present invention makes it possible for error detection to be distributed among various control units of a network and for shutdown of the various control units to be performed according to a shutdown matrix, in particular according to error, type of operation (function) and/or operating state, in particular in a distributed manner.

Then as the first and/or second condition for selection of the respective monitoring routines and/or the corresponding shutdown strategies, a selection is advantageously made of either error detection, error description, an operating mode (function) or an operating state, depending on the control unit or units for the shutdown strategy or for the monitoring routine according to error detection times and/or use tolerances or limits as part of error detection.

This security function can be subdivided expediently into at least the subfunctions of security core, monitoring routines and shutdown strategies, the security core being the same on all control units of the network. The security core advantageously also includes at least one of the subfunctions of initialization, error entry and restore testing.

In a special embodiment of the present invention, a control unit of the network includes a coordinating function for all the other control units, performing or controlling the central execution centrally for the entire network with respect to at least one of the following subfunctions of the security function: initialization, error entry, restore testing.

In another special embodiment, each control unit contains an individual pool of monitoring routines from which the monitoring routines can be selected according to the detectable error, with this pool or this sum of monitoring routines being different for each control unit. Also different in a special embodiment are the respective shutdown matrices of the individual control units with which the monitoring and shutdown strategies are distributed among all the control units of the network.

In another special embodiment, in addition to the completely distributed execution of monitoring and shutdown, the pool of monitoring routines, i.e., the monitoring routines selectable by each control unit, as well as the selectable shutdown matrices are the same or at least partially the same for each control unit, so that monitoring and shutdown strategies can be carried out redundantly or at least partially redundantly.

Not only does this advantageously yield the possibility that the control unit detecting the error also performs a shutdown according to its options (shutdown paths, shutdown strategies) but also the other control units which are still in the network can perform a shutdown according to their options (possible shutdown strategies, shutdown paths) on the basis of the error detection by the control unit as mentioned initially.

BRIEF DESCRIPTION OF THE DRAWINGS

FIG. 3 shows a shutdown matrix according to the present invention as an example for determining the respective shutdown strategy.

DETAILED DESCRIPTION

Figure 1:
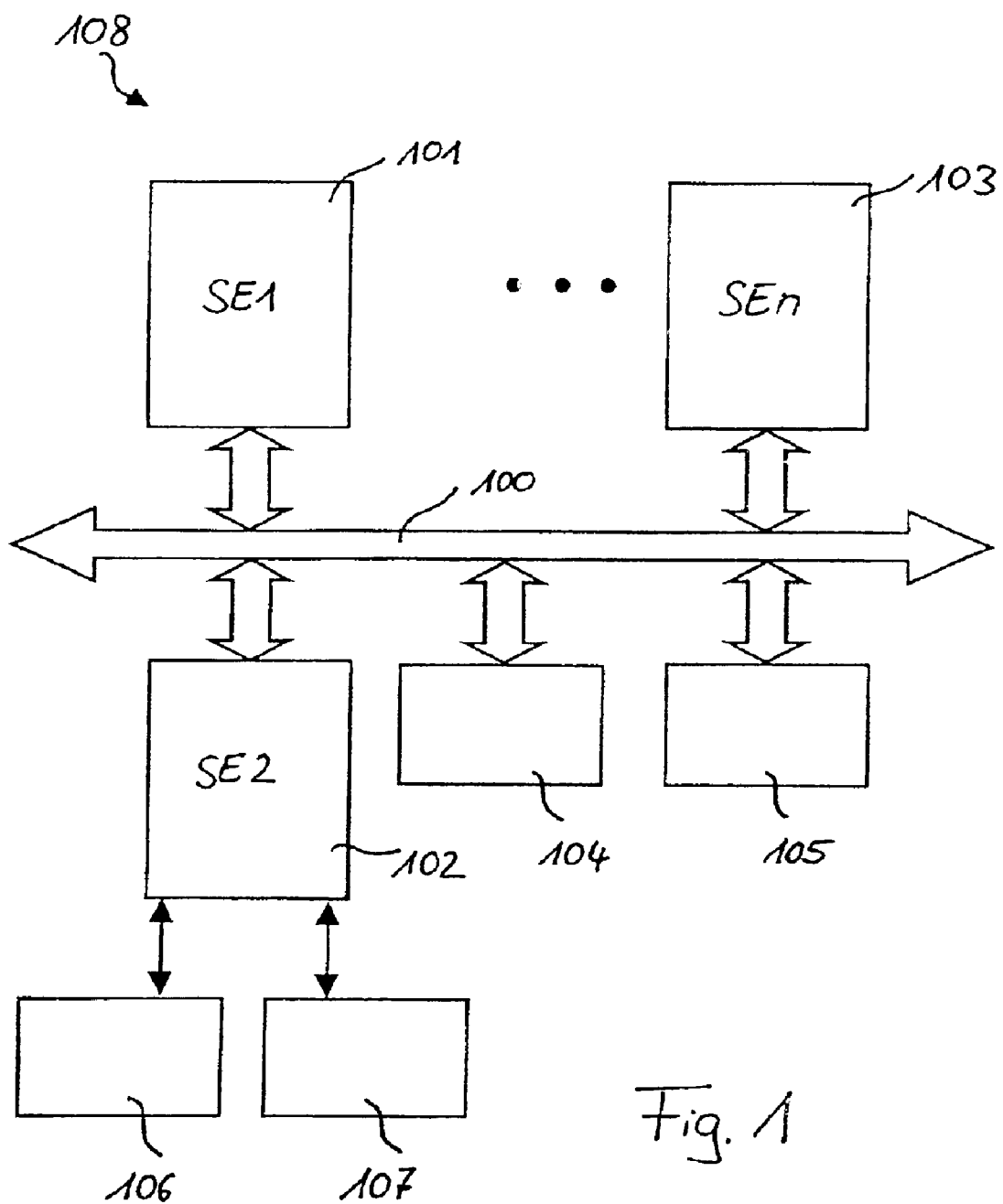
FIG. 1 shows a network having multiple control units connected by a bus system.

FIG. 1 shows a network 108 having control units SE1 through SEn 101 through 103 interconnected by a bus system 100. Bus system 100 may be composed of a single bus, e.g., a two-wire conductor, or multiple redundant and/or partially redundant databuses. Control units such as SE1, 101 include at least one data memory in which are stored control data and control programs according to the control function of the respective control unit, as well as security software SIS according to the present invention. In addition, an external memory unit 104 may also be connected to bus system 100 for this purpose. Likewise, elements 105 such as actuators or sensors to be controlled can also be connected to databus system 100. Such actuators or sensors, in particular in the context of the control function of the respective control device or the respective control unit, can be represented like control unit SE2, 102, can be connected to it directly and not via databus system 100, as shown for a sensor element 106 as an example and an actuator element 107 as an example. The bidirectionality of the double arrows used in the sensor connection or actuator connection shown here as well as the connecting arrows to the databus system is intended only to indicate the respective possibilities. A unidirectional connection from sensor 106 to control unit SE2, for example, or from control unit SE2 to actuator 107 would of course also be possible and conceivable, in particular in the case of a direct connection of elements 106 and 107 to control unit SE2. A bidirectional application is conceivable in the case of intelligent elements 106 and 107 in particular.

Since elements 101 through 105 and 106 and 107 shown here are arranged with a local distribution depending on the application, network 108 is also called a distributed system or systems. Such a distributed system or systems are used, for example, in automotive engineering, where SE2 is an engine controller or an engine control unit 102, for example, SE1 is a transmission controller, i.e., a transmission control device 101 interconnected via a databus system, in particular a CAN bus 100, for example. Thus, especially in the automotive field, any desired control units can be interconnected via a databus system or multiple databus systems which can be linked by a gateway to form a network 108, and they are monitored as a distributed system, especially in the security case. In addition to the automotive field, such an arrangement is also conceivable for other technical fields such as, for example, the area of production goods, in particular machine tools, or in networking other systems such as security systems.

Figure 2:
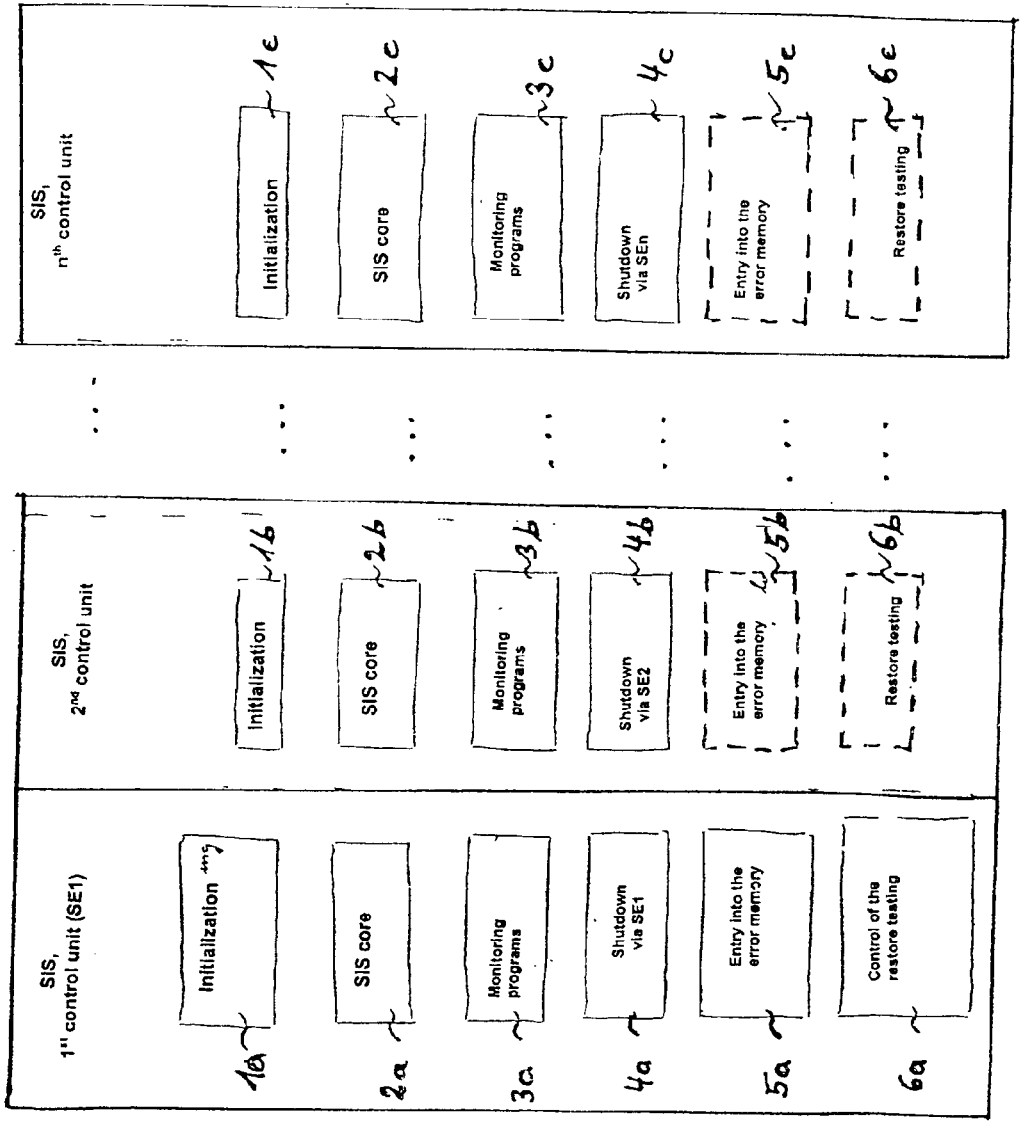
FIG. 2 shows the security function in particular as security software SIS for three control units as an example.

As already mentioned above, the basic design of security software SIS of the individual control units is illustrated in FIG. 2. Security software SIS is referred to in general below as security function SIS because it can be implemented outside of the software, e.g., in the hardware, i.e., it can be hardwired or the like, just like a mixed solution, i.e., hardwired and in the form of software. Therefore, control units SE1, SE2 through SEn are shown schematically in the context of their security function SIS.

In a first embodiment, security function SIS of the individual control units is designed similarly in principle. Security function SIS is subdivided into the following subfunctions or blocks: initialization (1a, 1b, 1c), the security function core, SIS core (2a, 2b, 2c), the block of monitoring programs (3a, 3b, 3c) containing various monitoring routines, the shutdown logic (4a, 4b, 4c), the blocks for entering the error in the error memory (5a, 5b, 5c) and for restore testing in the error event (6a, 6b, 6c).

Initialization (1a, 1b and 1c) depends upon the respective control unit and is performed once after the start of the overall system, for example, or in the automotive field after the ignition is switched on, or when a control unit that has been shut down, for example, is returned to operation. The blocks of the monitoring programs (3a, 3b and 3c) are the respective monitoring routines which are run through once, in particular per sampling time increment in discrete systems, in particular digital systems. A monitoring routine is assigned to each error, i.e., each monitoring routine can detect at least one error, and in particular each monitoring routine can detect precisely one error.

If various errors are classified into types of errors, the same thing is also true for each type of error. The respective monitoring routines may be the same on the distributed control units of the distributed system or the network, i.e., in the blocks of the monitoring programs (3a, 3b and 3c) or they may be specific for the respective control unit in the make-up of the individual monitoring routines.

The shutdown logic (4a, 4b, 4c) contains the technical shutdown program execution and depends on the hardware of the control unit and the execution of the shutdown strategies or the shutdown paths of the respective control unit.

It is assumed here that the data, flags or sensor values needed for the respective error monitoring are available to the respective control units. In addition, the selected shutdown should logically also be possible physically through the respective control units, i.e., the shutdown paths described here should be available.

This means that appropriately only those shutdown strategies which are feasible through the respective control unit on the basis of the given shutdown paths are provided in a shutdown matrix assigned to the respective control unit, or the presence of the required shutdown paths is monitored when shutdown strategies are specified or the required shutdown paths are set up.

The error is entered into the error memory (5a, 5b, 5c) when an error has been detected on the basis of the monitoring routines, in which case a shutdown is or has already been initiated and is initiated.

This error entry is optional, as is the restore testing (6a, 6b and 6c) in the case of control units 2 through n if control unit SE1, for example, is used as the coordinating controller as part of a second special embodiment. If there is a coordinating control unit such as SE1 which tracks the initialization of the various control units as in this particular embodiment, then it alone also performs entry of the error into the error memory, and in the event of an error, it organizes the restore testing. Initialization then also depends on the respective control unit and is performed after the start of the overall system or when the coordinated control unit returns a shutdown control unit back to operation. Initialization can then take place on an individual basis for each control unit, and initialization steps concerning the communication system, i.e., the databuses and/or the overall system, can be executed centrally by the coordinating control unit.

In any case, however, the subfunctions SIS core, monitoring programs and shutdown or shutdown strategies as subfunctions of security function SIS are the same for all control units of the network.

Depending on the type of shutdown or the shutdown strategy (explained below in the context of the shutdown matrix), a restore test can be performed if the reason for triggering the error no longer exists, which can also be ascertained as part of the restore testing. If the triggering factor was an elevated temperature, for example, or an excessively low battery voltage, the restore test is performed, e.g., when this elevated temperature or the excessively low battery voltage no longer prevails. Likewise, the restore test can be performed after expiration of a preselectable or variable period of time after error detection. In any case, at startup of the overall system, in particular every time the ignition is switched on, or the vehicle's starter switch is operated, a restore test is performed to verify error-free functioning of the control units of the distributed system.

The SIS core ($2a$, $2b$, $2c$) is a program part or a subfunction which is completely identical in all control units and thus is interchangeable. The function of the SIS core is essentially to select the shutdown strategy from the shutdown matrix (to be described below) according to an algorithm which is also described below, e.g., as a function of the respective error, the respective control unit, the operating mode and/or the operating state. The SIS core is thus processed identically on all the control units in the network. This SIS core thus selects the proper monitoring routine in the sampling step in question from the complete shutdown matrix (for the overall system or parts/control units of the overall system combined with regard to the shutdown matrix) or it selects only the shutdown matrix relevant for the respective control unit, then triggers it and executes it.

In the event of an error, the type of shutdown or shutdown strategy which depends on the operating state, the operating mode or the control unit is selected and triggered or executed in a differentiated manner by the SIS core with the help of the shutdown matrix.

Thus, monitoring can be performed on a distributed basis, i.e., it may run partially or completely redundantly or locally in a completely different control device. In other words, not only the control device that detects the error but also the other control devices in the network can perform a shutdown in accordance with their options (shutdown paths, shutdown strategies).

To be able to describe the function of the SIS core in greater detail, the basic design of the shutdown matrix as illustrated in FIG. 2 is explained. The shutdown matrix in FIG. 2 is made up of various columns. Each row is provided for a specific error. First column 10 shows the error number of the respective error, i.e. its error detection. A brief description of the respective error, e.g., for error labelling or the like, is stored in column 12. For example, a battery voltage that is too low or a temperature that is too high may be selected again here. The operating states in which the respective monitoring operations are to be performed are coded in binary form in column 11. An operating state may be, for example, initialization of the control unit, normal operation when driving, normal operation when the vehicle is at a standstill, active or passive, and so forth.

The respective monitoring is performed in the respective operating state when, for example, a one ("1") stands at the respective location instead of a zero ("0"), i.e., the corresponding place is marked or labelled somehow. The control units in which the monitoring routines for the respective error are to take place are coded in column 13, in particular also in binary form. For example, if a one stands in the respective place again instead of a zero, then the monitoring routine belonging to the error is performed in the respective control device or control unit.

In columns 14 and 15 are stored m detection times T1 through Tm and n limits G1 through Gn, where m, n>1 are stored as desired but as fixed values for error detection. These specific matrix elements may be filled out but need not necessarily be. In the case of extensive algorithms, it is self-evident that the respective times, limits and factors of monitoring may be accommodated in the monitoring routine itself or called up by it.

Types of shutdown of the individual errors are entered in last column 17 depending on the function or the process active at the time. For example, it is possible to differentiate whether ABS is active or, for example, ABS and ASR and ESP are active or whether an active steering measure is being implemented and a variable steering translation is active constantly. The same is also true as part of engine control, transmission control or other functions, in particular functions specific to the vehicle.

Depending on the prevailing operating mode/function or combination of functions/operating modes, a different shutdown is performed under some circumstances, i.e., a different shutdown strategy is run for the same error (the same row in the shutdown matrix here). The matrix elements of the shutdown matrix labelled as A1, A2, A3 and A4 or A5 and A6 in columns 17 and 19, respectively, in FIG. 2 determine the shutdown strategy in column 19 or the type of shutdown, which is why this was referred to as a differentiated shutdown in the introduction. The following are mentioned here as examples of various shutdown strategies: immediate shutdown, shutdown after the end of regulation, shutdown on standstill of the vehicle, shutdown but resumption of operation when the shutdown conditions no longer prevail, shutdown of individual control units or of the entire network and so forth.

As mentioned previously, a combination of different functions/operating modes can also be evaluated by block 18 and linked together to form a certain shutdown strategy as indicated with dotted lines, block 18 being optional, and when block 18 is omitted there is a one-to-one correlation of functions/operating modes with the shutdown strategies, depending on the error.

The function of the SIS core (*2a*, *2b*, *2c*) is to call up the respective monitoring routines, depending on columns 11 and 13, for the respective control unit in each scanning step. The totality, i.e., most of the monitoring routines available in the respective control unit are labelled with monitoring programs, i.e., *2a*, *2b*, *2c*. These routines may be different individually or the same in each control unit as the majority of the monitoring routines or they may also be stored centrally in a central storage element as the majority of all monitoring routines. The required information, in particular from columns 14 and 15, can also be transferred to the monitoring routines.

In the case of an error detected by the monitoring routine (s), the defined measure for processing the error, i.e., shutdown, is selected and initiated by *4a*, *4b*, *4c*, depending on columns 10 and 17 or 19. The SIS core is identical in all control units. The shutdown matrix may be identical in all control units, but it is sufficient for the parts relevant for the respective control unit to be imaged in the respective control unit itself according to column 13. Depending on column 13, monitoring may also be performed in duplicate, i.e., redundantly, on different control units.

If there is a coordinating control device or a coordinating control unit as mentioned above, e.g., SE1, then the error number is relayed according to column 10 to control unit 1 SE1 in the case of detection of an error by control unit SE2, for example, and control unit SE2 and/or SE is shut down according to column 17 or 19, i.e., according to the shutdown strategies given there.

As described above, individual functions may also be linked with the resulting shutdown strategy in 19 through block 18.

For security reasons, the shutdown paths may be different.

Control unit 1 SE1 makes an entry in the error memory and organizes the resumption of operation of control unit SE2 and/or the overall system.

If there is no coordinating control unit, error numbers or error identifications are not exchanged, and each control unit shuts down according to column 17 or the given shutdown strategies 19 and makes the entry into the error memory and resumption of operation or the restore test itself, or in case of doubt, only on startup of the entire system, in particular when switching on the ignition.

The method described in the description can be stored as a program or a program product on a data medium such as ROM, in particular CD-ROM, EPROM, diskette, flash EPROM, RAM, etc. and can be introduced into and read out from a control unit. Steps of the method according to the description are then carried out in the control unit or the distributed system, which is why this program or program product through which the method according to the present invention is implemented is also the object of the present invention.

What is claimed is:

1. A method for monitoring a plurality of control units in a network, comprising the steps of:
    providing to each control unit a security function for detecting a plurality of errors;
    assigning a monitoring routine selected from a plurality of monitoring routines to each error;
    assigning a shutdown matrix that is subdivided according to the plurality of errors to the security function;
    selecting at least one of the plurality of monitoring routines according to the errors present in the shutdown matrix, wherein:
        depending on at least one first condition, the shutdown matrix contains a plurality of shutdown strategies; and
    on detection of at least one of the plurality of errors by one of the plurality of monitoring routines and depending on at least one of the at least one first condition and at least one second condition, performing one of the plurality of shutdown strategies in the network to shut down at least one of the plurality of control units.

2. The method according to claim 1, wherein at least one of the at least one first condition and the at least one second condition corresponds to at least one of:
    an error detection,
    an error description,
    an operating mode,
    an operating state,
    a control unit for shutdown strategy,
    a control unit for monitoring routine,
    an error detection time, and
    one of a use tolerance and use limit.

3. The method according to claim 1, further comprising the step of:
    subdividing the security function into at least subfunctions relating to a security core, the plurality of monitoring routines, and the plurality of shutdown strategies, the security core being the same on all the control units of the network.

4. The method according to claim 3, wherein the security function additionally includes at least one of:
    an initialization,
    an error entry, and
    a restore testing.

5. The method according to claim 1, further comprising the step of:
    providing to one of the plurality of control units of the network a coordinating function for all other control units in the plurality of control units with respect to at least one of an initialization subfunction, an error entry subfunction, and a restore testing subfunction contained in the security function of the control unit provided with the coordinating function.

6. The method according to claim 1, wherein:
    those of the plurality of monitoring routines which can be selected by each control unit are different for each control unit according to the errors that can be detected as well as the respective shutdown matrices of the control units, and
    the monitoring and the shutdown strategies are distributed among all the control units of the network.

7. The method according to claim 1, wherein:
    those of the monitoring routines which can be selected by each control unit are one of the same and partially the same for each control unit according to the errors that can be detected as well as the respective shutdown matrices of the control units, and
    the monitoring and the shutdown strategies are one of redundant and capable of being carried out in a partially redundant manner.

8. A device for monitoring a plurality of control units in a network, comprising:

an arrangement for providing to each control unit a security function for detecting a plurality of errors;

an arrangement for assigning a monitoring routine selected from a plurality of monitoring routines to each error;

an arrangement for assigning a shutdown matrix that is subdivided according to the plurality of errors to the security function;

an arrangement for selecting at least one of the plurality of monitoring routines according to the errors present in the shutdown matrix, wherein:

depending on at least one first condition, the shutdown matrix contains a plurality of shutdown strategies; and an arrangement for, on detection of at least one of the plurality of error by one of the plurality of monitoring routine and depending on at least one of the at least one first condition and at least one second condition, performing one of the plurality of shutdown strategies in the network to shut down at least one of the plurality of control units.

9. A network, comprising:

a plurality of control units, each control unit including:

an arrangement for providing to each control unit a security function for detecting a plurality of errors;

an arrangement for assigning a monitoring routine selected from a plurality of monitoring routines to each error;

an arrangement for assigning a shutdown matrix that is subdivided according to the plurality of errors to the security function;

an arrangement for selecting at least one of the plurality of monitoring routines according to the errors present in the shutdown matrix, wherein:

depending on at least one first condition, the shutdown matrix contains a plurality of shutdown strategies; and an arrangement for, on detection of at least one of the plurality of error by one of the plurality of monitoring routine and depending on at least one of the at least one first condition and at least one second condition, performing one of the plurality of shutdown strategies in the network to shut down at least one of the plurality of control units.

10. A program stored on a computer readable medium for causing at least one control unit of a network to perform, when executed, the steps of:

providing to each control unit a security function for detecting a plurality of errors;

assigning a monitoring routine selected from a plurality of monitoring routines to each error;

assigning a shutdown matrix that is subdivided according to the plurality of errors to the security function;

selecting at least one of the plurality of monitoring routines according to the errors present in the shutdown matrix, wherein:

depending on at least one first condition, the shutdown matrix contains a plurality of shutdown strategies; and on detection of at least one of the plurality of error by one of the plurality of monitoring routine and depending on at least one of the at least one first condition and at least one second condition, performing one of the plurality of shutdown strategies in the network to shut down at least one of the plurality of control units.

* * * * *